Figure 1:
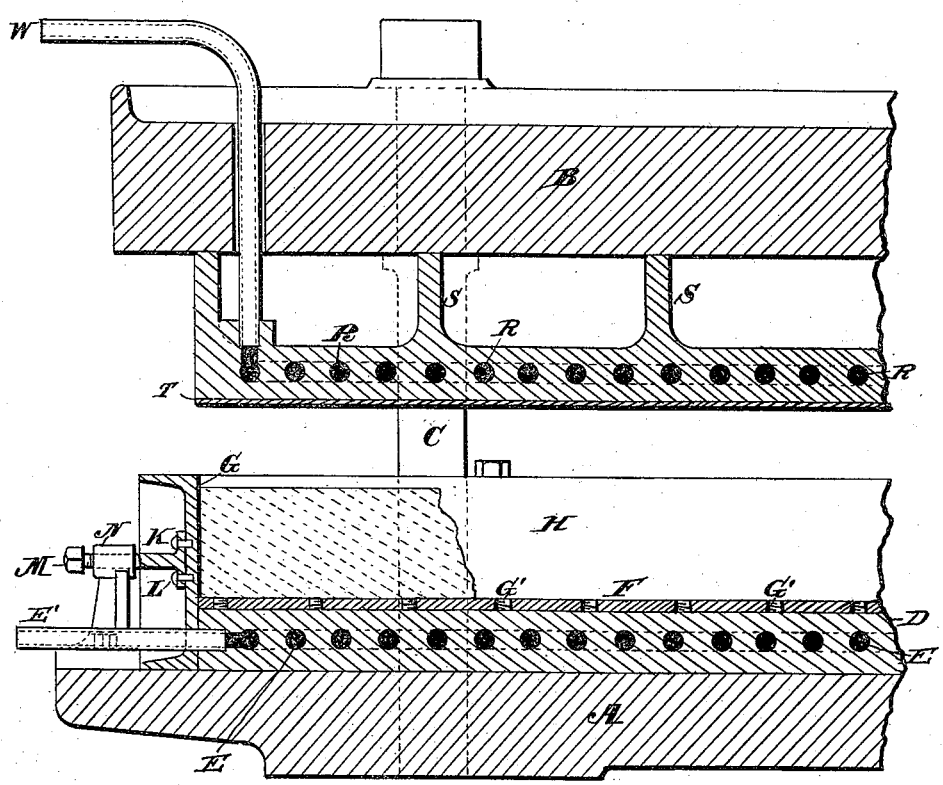

(No Model.)

J. B. EDSON.
APPARATUS FOR WORKING ZYLONITE.

No. 356,108. Patented Jan. 18, 1887.

Witnesses.
Robert Everett.
Vinton Coombs

Inventor:
Jarvis B. Edson,
By James L. Norris.
Atty.

N. PETERS, Photo-Lithographer, Washington, D. C.

UNITED STATES PATENT OFFICE.

JARVIS B. EDSON, OF BROOKLYN, ASSIGNOR TO THE AMERICAN ZYLONITE COMPANY, OF NEW YORK, N. Y.

APPARATUS FOR WORKING ZYLONITE.

SPECIFICATION forming part of Letters Patent No. 356,108, dated January 18, 1887.

Application filed December 28, 1885. Serial No. 186,862. (No model.)

*To all whom it may concern:*

Be it known that I, JARVIS B. EDSON, a citizen of the United States, residing at Brooklyn, in the county of Kings and State of New York, have invented new and useful Improvements in Apparatus for Working Zylonite, of which the following is a specification.

The object of this invention is the formation of slabs of zylonite or other pyroxyline compounds into a rectangular shape of considerable thickness, whereby they may be sliced or cut into thin sheets for casting or forming various articles.

The invention consists in a composite plate perforated and filled with zylonite or other pyroxyline compound which is flush, or substantially so, with the surface of the plate as a means for holding a block of plastic material to a metal bed, for the purpose of reducing said block into sheets.

The invention also consists in a metallic plate for use in presses for pressing zylonite or other pyroxyline material into slabs for sheeting purposes, said plate being provided with a series of openings for receiving and sustaining in position plugs of pyroxyline material having their ends flush, or substantially so, with the surface of the plate, and to which the slabs are subsequently attached during the molding process.

The invention also consists in a metallic plate for use in presses for pressing zylonite or other pyroxyline material into slabs for sheeting purposes, said plate being provided with a series of screw-threaded openings for receiving and sustaining in position plugs of zylonite or pyroxyline material having their ends flush, or substantially so, with the surface of the plate, and to which the slabs are subsequently attached during the molding process.

The invention also consists in the combination of a mold comprising detachable plates and a false bottom or plate having holes for the passage of plugs of pyroxyline material with a die having a thin sheet of metal forming its face to adhere to the molded slab.

The invention also consists in a mold for molding slabs of pyroxyline or other plastic compounds, combining in its structure a false bottom having a series of orifices for the passage of plugs of pyroxyline material by which to connect it with the molded slab and detachable side walls composed of channeled bars.

The invention also consists in a mold for molding slabs of pyroxyline or other plastic compounds, combining in its structure a false bottom having a series of orifices for the passage of plugs of pyroxyline material by which to connect it with the molded slab and channeled bars detachably connected and provided with attached ribs to receive the pressure of screws.

The invention finally consists in the combination of a platen, a bracket, and screw with a mold comprising detachably-connected channeled bars having attached ribs and a false bottom or plate having a series of orifices for the passage of plugs of pyroxyline material to engage the molded material.

The invention is illustrated in the accompanying drawings, in which—

Figure 2:
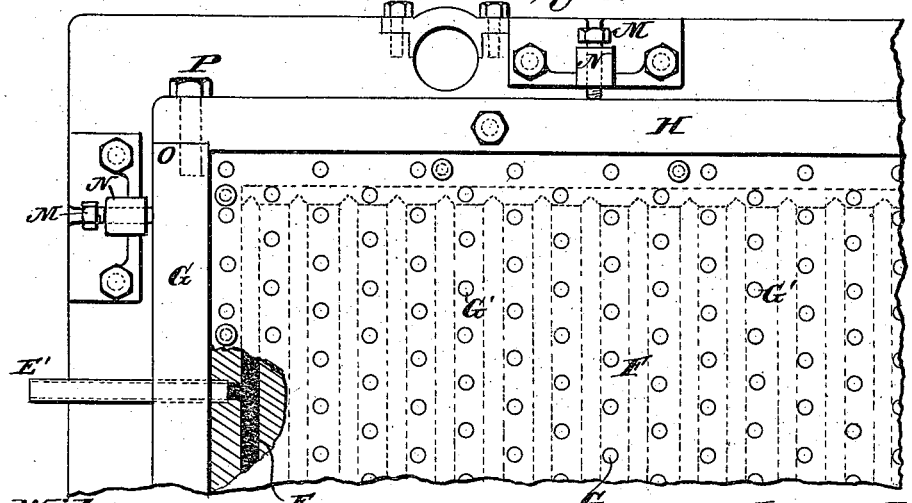

Figure 1 is a vertical section of a portion of the platens of a press, with sections also of the molding devices. Fig. 2 is a plan of the bottom of the mold.

In order to enable those skilled in the art to make and use my invention, I will now proceed to describe the same, referring to the drawings, where—

The letter A indicates a portion of the lower platen, and B a portion of the upper one, supported by the rod C, forming a part of the housing or frame-work.

Upon the lower platen, A, is placed the supplemental platen, D, which is cast with perforations like tubes, as at E, connected to a pipe at E', for conducting steam or water into the lower portion of the molding-box. Upon said platen is laid a composite plate, F, which actually forms the bottom of the mold, and which is perforated with numerous holes, G', through which are passed plugs of seasoned zylonite or other pyroxyline material for attaching the slabs to said plate. The length of these zylonite plugs is just equal to the thickness of the plate, whereby the ends of the plugs are flush, or substantially so, with the surface of the plate, and to such exposed ends of the plugs the pyroxyline slabs adhere. Around the plate F, as well as the one it rests on, there is formed a chase or side plates of the mold, as at G and H. This chase or box is formed of channeled bars, a cross-section of which is shown at G, Fig. 1, the flat side of which forms the face of the mold, and the back or channel side is strengthened by a rib at K of T-iron riveted on the bottom of the channel at L, and against the back of the rib is a set-screw at M, extending through a bracket, N, which is fastened upon the platen of the press. Each of the sides of the said box or chase is constructed in this manner, and the corners are matched together, as shown at O, Fig. 2, and secured by screw-bolts at P, so that a very strong box or chase is formed around the bottom plate, F, of the mold.

The upper die is cast with holes, as at R, the same as the lower portion of the mold, and it is formed with ribs, as at S, to give it strength and to keep it away from the upper platen of the press, so that in being heated or cooled it will not affect the temperature of the platen above. Upon its face is fitted a thin sheet of metal at T, which forms the face of the die, and which will adhere to the slab of zylonite after pressure has been removed, so that the press may be instantly opened without any trouble from adhesion to the slab, and then the thin sheet may be stripped off by gradually raising one edge and rolling it back.

Steam or water may be introduced into the upper die through a pipe at W, whenever desired, for changing the temperature of the material under pressure.

With such a construction of the molds it must be evident that the slab can be easily uncovered, as the top plate will permit the press to be easily opened, and the sides can be as readily removed from around the slab by releasing the set-screws and those at the corners.

The composite plate F is made of perforated metal and has its perforations filled with zylonite or other pyroxyline composition, thereby making a solid plate with a flush surface, free from indentations or elevations. These plugs may be inserted in the plate from below if the holes are larger at the bottom than at the top, or, if the holes are uniform throughout in diameter and threaded, then zylonite screws will be inserted therein and trimmed off flush. When a "heat" is made the mass of zylonite becomes attached by the inherent properties it possesses to the exposed surfaces of the material filling the holes, and the block is formed and firmly held by these plugs and the metallic plate, so that it can be readily reduced to sheets by any of the well-known devices for such purposes.

It is obvious that this application is a continuation of the one filed by me December 19, 1881, Serial No. 48,199, and for the purpose of more fully illustrating and describing the nature of the composite plate F.

I am aware that blocks of plastic material have been shaped in a mold with the bottom parts of the blocks molded or dovetailed in cast-iron plates, which serve to secure the blocks to the bed of the sheeting-machine, as in English Patent No. 2,070, A. D. 1871. Such, therefore, I do not claim.

Further, I know it to be old, and do not broadly claim the affixing of a slab of plastic material upon a bed or plate by causing the plastic material to connect itself therewith through the medium of apertures or projections constructed upon said bed or plate, heat and pressure being used to effect the desired connection, so that said slab may be divided or sheeted.

Having thus described my invention, what I claim is—

1. The composite plate F, perforated and filled with zylonite or other pyroxyline compound, which is flush, or substantially so, with the surface of the plate, as a means for holding a block of plastic material to a metal bed for the purpose of reducing said block to sheets, substantially as described.

2. A metallic plate for use in presses for pressing zylonite or other pyroxyline material into slabs for sheeting purposes, said plate being provided with a series of openings for receiving and sustaining in position plugs of pyroxyline material having their ends flush, or substantially so, with the surface of the plate and to which the slabs are subsequently attached during the molding process, substantially as described.

3. A metallic plate for use in presses for pressing zylonite or other pyroxyline material into slabs for sheeting purposes, said plate being provided with a series of screw-threaded openings for receiving and sustaining in position plugs of pyroxyline material having their ends flush, or substantially so, with the surface of the plate and to which the slabs are subsequently attached during the molding process, substantially as described.

4. The combination of the mold comprising detachable plates G and H and the false bottom F, having holes for the passage of plugs of pyroxyline material, with a die having a thin sheet of metal, T, forming its face to adhere to the molded slab, substantially as described.

5. A mold for molding slabs of pyroxyline or other plastic compounds, combining in its structure a false bottom having a series of orifices for the passage of plugs of pyroxyline material by which to connect it with the molded slab and detachable side walls composed of channeled bars, substantially as described.

6. A mold for molding slabs of pyroxyline or other plastic compounds, combining in its structure a false bottom having a series of orifices for the passage of plugs of pyroxyline material by which to connect it with the mold-slab, and channeled bars detachably connected and provided with attached ribs K, to receive the pressure of screws M, substantially as described.

7. The combination of the platen A, the bracket N, and the screw M with the mold consisting of the detachably-connected channeled bars G and H, having attached ribs K, and the false bottom F, having a series of orifices for the passage of plugs of pyroxyline material to engage the molded material, substantially as described.

In testimony whereof I have affixed my signature in presence of two witnesses.

JARVIS B. EDSON.

Witnesses:
    JOS. L. COOMBS,
    J. A. RUTHERFORD.